US012609907B2

(12) United States Patent
Vemuri et al.

(10) Patent No.: US 12,609,907 B2
(45) Date of Patent: Apr. 21, 2026

(54) OPTIMIZED MULTIMODE PRIVATE NETWORK MESSAGING

(71) Applicant: GM GLOBAL TECHNOLOGY OPERATIONS LLC, Detroit, MI (US)

(72) Inventors: Venkata Naga Siva Vikas Vemuri, Farmington Hills, MI (US); Rajas M. Sevekari, Macomb, MI (US); Scott T. Droste, West Bloomfield, MI (US); Charles A. Everhart, Canton, MI (US); John Sergakis, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 419 days.

(21) Appl. No.: 18/499,510

(22) Filed: Nov. 1, 2023

(65) Prior Publication Data

US 2025/0141830 A1     May 1, 2025

(51) Int. Cl.
| | |
|---|---|
| *H04L 51/58* | (2022.01) |
| *H04W 4/40* | (2018.01) |
| *H04W 72/56* | (2023.01) |

(52) U.S. Cl.
CPC .............. *H04L 51/58* (2022.05); *H04W 4/40* (2018.02); *H04W 72/56* (2023.01)

(58) Field of Classification Search
CPC .......... H04L 51/58; H04W 4/40; H04W 72/56

USPC .......................................................... 455/466
See application file for complete search history.

(56) References Cited

U.S. PATENT DOCUMENTS

| | | | |
|---|---|---|---|
| 8,238,980 B1 * | 8/2012 | Shusterman ...... | H04W 52/0251 |
| | | | 455/435.2 |
| 2016/0057729 A1 * | 2/2016 | Horn ..................... | H04W 48/18 |
| | | | 455/458 |
| 2016/0227440 A1 * | 8/2016 | Forssell ................ | H04W 28/10 |
| 2019/0045336 A1 | 2/2019 | Chang | |
| 2020/0283004 A1 | 9/2020 | Avetisian | |
| 2021/0385865 A1 | 12/2021 | Mueck et al. | |

FOREIGN PATENT DOCUMENTS

DE          102021209988 A1     3/2022

* cited by examiner

*Primary Examiner* — Huy C Ho
(74) *Attorney, Agent, or Firm* — Quinn IP Law

(57) ABSTRACT

Optimization of multimode messaging via a private network having a hybrid platform. The optimization may include identifying performance priority parameters included within a plurality of data sets, fragmenting the data sets into one or more subsets, generating reprioritize priority for the subsets, assessing transmission performance for the plurality of radio access, and assigning each of the subsets for transmission from the hybrid platform via one of the radio access points based on the transmission performance and the reprioritized priority.

20 Claims, 3 Drawing Sheets

OPTIMIZED MULTIMODE PRIVATE NETWORK MESSAGING

INTRODUCTION

The present disclosure relates to optimized multimode vehicle messaging, such as but not necessarily limited to optimized multimode messaging of the type suitable for use in communicating a plurality of data sets to a vehicle or other device via a plurality of radio access points operating at a hybrid platform of a private network.

Vehicles may include capabilities for supporting an ever expanding range of services, with the operation of the services in some circumstances being dependent on various modes of wireless messaging, or what may be referred to more simply as multimode messaging. To support the services, and optionally other wireless communication based operations, some vehicles may include a telematics unit or other hardware capable of supporting multimode messaging across disparate radio networks, i.e., capabilities to support differing modes of messaging across differing types of radio access networks. In the past, an originator of a message or other data set intended for wireless communication to a vehicle would be responsible for selecting performance priority parameters for the transmission thereof. Such dependency on the message originator may undesirably limit or prevent the participation of original equipment manufacturers (OEMs) and/or other entities responsible for maintaining a private network for communicating with the vehicle from overseeing message delivery. This historic reliance on the massage originator may effectively thwart backend support and/or upstream management at the private network level, which may in turn restrain those having a vested interest in overseeing vehicle messaging from maintaining or having oversight, assuring customer satisfaction, and/or otherwise being involved or participatory in the wireless delivery of multimode messaging.

SUMMARY

One non-limiting aspect of the present disclosure relates to optimizing multimode messaging carried over a private network so as to enable an entity having a vested interest is able to oversee, manage, or otherwise direct transport of the messaging independently of performance priority parameters selected by an originator.

One non-limiting aspect of the present disclosure relates to a method for optimizing multimode messaging via a private network having a hybrid platform. The method may include receiving a plurality of data sets from one or more entities external to the private network and identifying performance priority parameters included within the data sets. The performance priority parameters may include a transmission priority level requested for the data set associated therewith. The method may further include fragmenting the data sets into one or more subsets and generating reprioritized priority for the subsets based on the performance parameters specified for the data set associated therewith, optionally including increasing or decreasing the transmission priority level for each one or more of the subsets having data outside of the transmission priority level requested for the data set associated therewith. The method may still further include assessing transmission performance for a plurality of radio access points configured for transmitting multimode messaging from the hybrid platform and assigning each of the subsets for transmission via one of the radio access points based on the transmission performance and the reprioritized priority.

The method may include transmitting the subsets from the radio access points such that at least a portion of the subsets fragmented from a first data set of the data sets are transmitted from different ones of the radio access points.

The method may include transmitting the subsets of the first data set related to a first data type from a first radio access point of the radio access points and the subsets of the first data set related to a second data type from a second radio access point of the radio access points.

The method may include selecting the first radio access point from one or more non-cellular access points of the radio access points and selecting the second radio access point from one or more cellular access points of the radio access points.

The method may include the first data type corresponding with audio and the second data type corresponding with video.

The method may include the first data type corresponding with a first application and the second data type corresponding with a second application.

The method may include the first application requiring real-time communication and the second application requiring non-real-time communication.

The method may include transmitting the subsets from the radio access points such that at least a portion of the subsets fragmented from a first data set of the data sets are transmitted at an elevated priority level relative to the transmission priority level requested for the first data set.

The method may include transmitting the subsets of the first data set related to a first data type at the elevated priority level and the subsets of the first data set related to a second data type at the transmission priority level requested for the first data set.

The method may include identifying the first data type to require cellular based transmission and identifying the second data type to require non-cellular based transmission.

The method may include transmitting the subsets from the radio access points such that at least a portion of the subsets fragmented from a first data set of the data sets are transmitted at a decreased priority level relative to the transmission priority level requested for the first data set.

The method may include transmitting the subsets of the first data set related to a first data type at the decreased priority level and the subsets of the first data set related to a second data type at the transmission priority level requested for the first data set.

The method may include identifying the first data type to require non-cellular based transmission and identifying the second data type to require cellular based transmission.

The method may include identifying the first data type to require a non-guaranteed or variable bitrate and identifying the second data type to require a guaranteed or fixed bitrate.

The method may include identifying transport timing for each of the radio access points based on the transmission performance and assigning the subsets having greater reprioritized priority to the radio access points having shorter transport times relative to the subsets having lower reprioritized priority.

The method may include identifying transmission bitrates for each of the radio access points based on the transmission performance and assigning the subsets having greater reprioritized priority to the radio access points having greater transmission bitrates relative to the subsets having lower reprioritized priority.

One non-limiting aspect of the present disclosure relates to a system for optimizing multimode messaging with a vehicle. The system may include a hybrid platform having a plurality of radio access points configured for supporting multimode messaging with the vehicle according to differing types of wireless radio communications, each of the radio access points supporting communications over a corresponding radio network. The system may further include a back office optimizer configured for identifying performance priority parameters included within a plurality of data sets, fragmenting the data sets into one or more subsets, generating reprioritized priority for the subsets based on the performance parameters specified for the data set associated therewith, including altering a transmission priority level requested for one or more of the subsets, assessing transmission performance for the plurality of radio access, and assigning each of the subsets for transmission from the hybrid platform via one of the radio access points based on the transmission performance and the reprioritized priority. The system may further include a telematics unit configured for use onboard the vehicle to wirelessly receive the data sets over each one of the radio access points operating of the hybrid platform.

The back office controller may be configured for identifying at least a portion of the subsets fragmented from a first data set to be associated with at least a first data type from a second data type, identifying transmission bitrates for each of the radio access points based on the transmission performance, determining the first data type to require a guaranteed or fixed bitrate, determining the second type to require a non-guaranteed or variable bitrate, assigning the subsets of the first data set associated with the first data type for transmission from one of the radio access points providing cellular based transmission, and assigning the subsets of the first data set associated with the second data type for transmission from one of the radio access points providing non-cellular based transmission.

The hybrid platform may include an Internet of Things (IoT) message broker controller configured for communicating IoT messages over an IoT network of a corresponding one of the radio access points, a Wi-Fi message controller configured for communicating Wi-Fi messages over a Wi-Fi network of a corresponding one of the radio access points, and a cellular controller configured for communicating cellular messages over a cellular network of a corresponding one of the radio access points, wherein the cellular network provides the cellular based transmission and the IoT and Wi-Fi networks provide the non-cellular based transmissions.

One non-limiting aspect of the present disclosure relates to a computer-readable storage medium having a plurality of non-transitory instructions stored thereon, which when executed with one or more processors, are operable for optimizing multimode messaging via a private network having a hybrid platform. The non-transitory instructions may be executable for identifying performance priority parameters included within a data set, the performance priority parameters including a transmission priority level requested for the data set, fragmenting the data set into one or more subsets, each subset including a portion of the data set, generating reprioritized priority for the subsets based on the performance parameters specified for the data set associated therewith, including increasing or decreasing the transmission priority level for one or more of the subsets, assessing transmission performance for a plurality of radio access points configured for transmitting multimode messaging from the hybrid platform, and assigning the subsets for transmission via the radio access points based on the transmission performance and the reprioritized priority, including assigning a first portion of the subsets for transmission from a first radio access point of the radio access points and a second portion of the subsets for transmission from a second radio access point of the radio access points.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
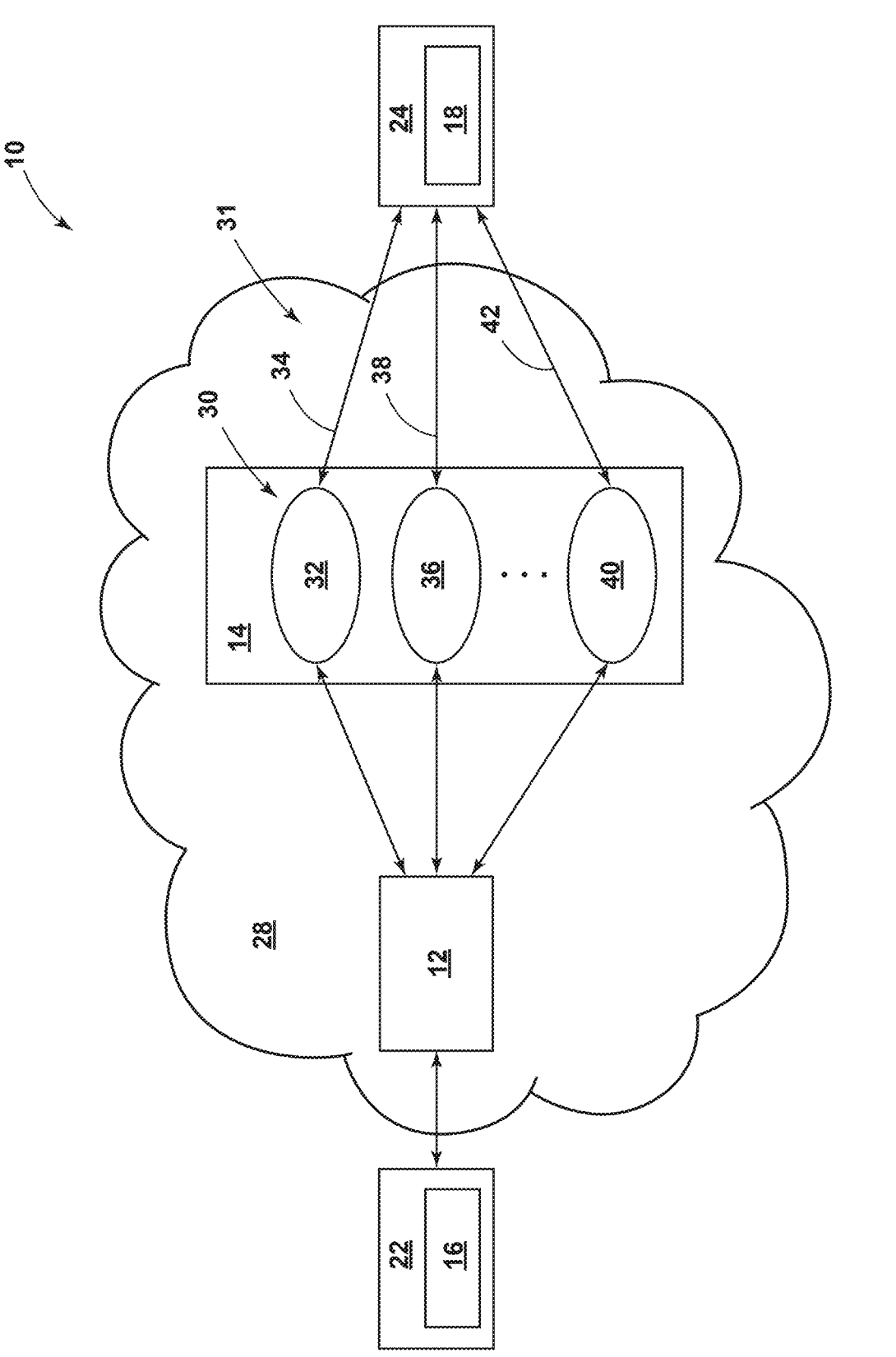
FIG. 1 illustrates a system optimized for multimode messaging in accordance with one non-limiting aspect of the present disclosure.

FIG. 1 illustrates a system 10 for multimode messaging in accordance with one non-limiting aspect of the present disclosure. The system 10 may include a back office optimizer 12 configured for operating with a hybrid platform 14 to facilitate multimode message exchange between one or more servers 16, a telematics unit 18, and/or additional entities, devices, etc. The system 10 is predominantly described with respect to the servers 16 operating in cooperation one or more of the same of different mobile device, phone, computer, or other originators 22 and the telematics unit 18 operating onboard a vehicle 24, such as but not necessarily limited to an automobile. The system 10 is described in this manner for exemplary and non-limiting purpose to highlight advantageous capabilities of the present disclosure to support a multimode messaging environment whereby customer facing endpoints, i.e., the servers 16 and the telematics unit 18, may benefit from backend support or upstream management, testing, etc. The back office optimizer 12 and/or the hybrid platform 14, which may reside on separate or common infrastructures, such as a server or virtual platform, may be included as part of a private network 28. The private network 28 may be configured for providing oversight, assuring customer satisfaction, and/or otherwise being involved or participatory in the wireless delivery of multimode messaging that may affect performance of the vehicle 24 and/or the services thereat. The present disclosure, however, is not intended to be so limited as one having ordinary skill in the art would readily appreciate the advantageous capabilities of the system 10 to support multimode messaging for other types of endpoints.

The servers 16 and/or the telematics unit 18 may be configured to exchange information, data, messages, etc. with each other via the hybrid platform 14, which may be generically referred to as data sets. One non-limiting aspect of the present disclosure contemplates the servers 16 being configured for remotely supporting, directing, controlling, or otherwise influencing services, capabilities, operations, etc. onboard the vehicle 24 via exchange of the data sets with the telematics unit 18. This may be accomplished by the servers 16 generating the data sets to include instructions, data, files, media, etc. for transmission to the vehicle 24, and in some cases responsively receiving data sets from the telematics unit 18. The data sets, for example, may be used to stream a video to a player onboard the vehicle 24, conducting a video or voice call within an infotainment onboard the vehicle 24, remotely unlock the vehicle 24, start an engine or other system 10 onboard the vehicle 24, e.g., a heating and/or cooling system 10, perform diagnostics, e.g., request battery stated charge, fuel levels, etc., and/or to facilitate a wide range of other services for the vehicle 24. One non-limiting aspect of the present disclosure contemplates configuring the back office optimizer 12 and the hybrid platform 14 to manage transport of data sets between the servers 16 and the telematics unit 18 via a plurality of radio access points 30 and their attendant radio networks 31. This capability to provide backend support or upstream management of data set communications may be advantageous in enabling those having a vested interest in operation of the vehicle 24 to control data set communications therewith across differing types of wireless radio communications of the radio access points 30.

The hybrid platform 14 is shown for non-limiting purposes with at least a portion of the radio access points 30 being disparately configured for providing an Internet of Things (IoT) radio access point 32 configured for communicating IoT messages over an IoT network 34, a Wi-Fi radio access point 36 configured for communicating Wi-Fi messages over a Wi-Fi network 38, and a cellular radio access point 40 configured for communicating cellular messages over a cellular network 42. The IoT message broker radio access point 32 may be responsible for message handling and routing within the IoT network 34, such as by acting as a centralized communication hub that receives messages from various IoT devices, sensors, or applications and routes them to the appropriate destinations. The message broker radio access point 32 may enable decoupling of communication between different components by following a publish/ subscribe model. The Wi-fi radio access point 36 may be specific to managing the Wi-Fi network 38, such as in environments where Wi-Fi connectivity may be available, and may be configured for overseeing the configuration, management, and optimization of Wi-Fi access points (APs) within a network. It may handle tasks such as AP provisioning, channel assignment, security settings, and client device authentication. The cellular radio access point 40 may be responsible for managing cellular communication within the cellular network 42, such as by serving as a central point that coordinates communication between cellular devices and the cellular network infrastructure.

The hybrid platform 14 may be configured in this manner to support multimode messaging with the telematics unit 18 using the IoT broker, Wi-Fi, and/or cellular radio access points 32, 36, 40 and corresponding IoT, Wi-Fi, and/or cellular messages. The multimode messaging may be characterized in this manner to correspond with capabilities of the hybrid platform 14 to facilitate exchanging messages with the telematics unit 18 according to differing modes of messaging associated with each of the radio access points and the corresponding radio networks. This multimode capability may be beneficial in supporting an ever expanding range of services being made available onboard the vehicle 24, such as to support the services, at least in some non-limiting circumstances, that may be dependent on various modes of wireless messaging, or what may be referred to more simply as multimode messaging. To maximize support of the services, and optionally other wireless communication based operations, the telematics unit 18, or other similar hardware onboard the vehicle 24, may be configured for supporting the multimode messaging across each of the disparate radio networks 31, i.e., capabilities to support differing modes of messaging across differing types of radio networks 31.

One non-limiting aspect of the present disclosure relates to configuring the back office optimizer 12 to oversee multimode messaging related activities of the hybrid platform 14. The back office optimizer 12, for example, may be configured to receive a plurality of data sets from the servers 16 and thereafter control delivery of the data sets to the telematics unit 18 using multimode messaging dispersed across the radio access points. The back office optimizer 12 may be configured for determining transmission performance for the radio networks 31 associated with the radio access points 30, and based thereon, to controllably partition the data sets for communication according to selectable design parameters. The back office optimizer 12, relatedly, may be configured for assessing a throughput, a cost, a time sensitivity, a data rate, a quality of service, and/or additional metrics, and based thereon, to partition the data sets for delivery across one or more of the radio access points 30. FIG. 1 illustrates a non-limiting example whereby the back office optimizer 12 may receive a plurality of data sets from the servers 16 and thereafter parse the data sets for delivery using each of the IoT, Wi-Fi, and cellular messages, i.e., such that a least a portion of the data sets are communicated through each of the IoT broker, Wi-Fi, and cellular radio access points 32, 36, 40 for corresponding exchange over the related IoT broker, Wi-Fi, and cellular networks 34, 38, 42.

Figure 2:
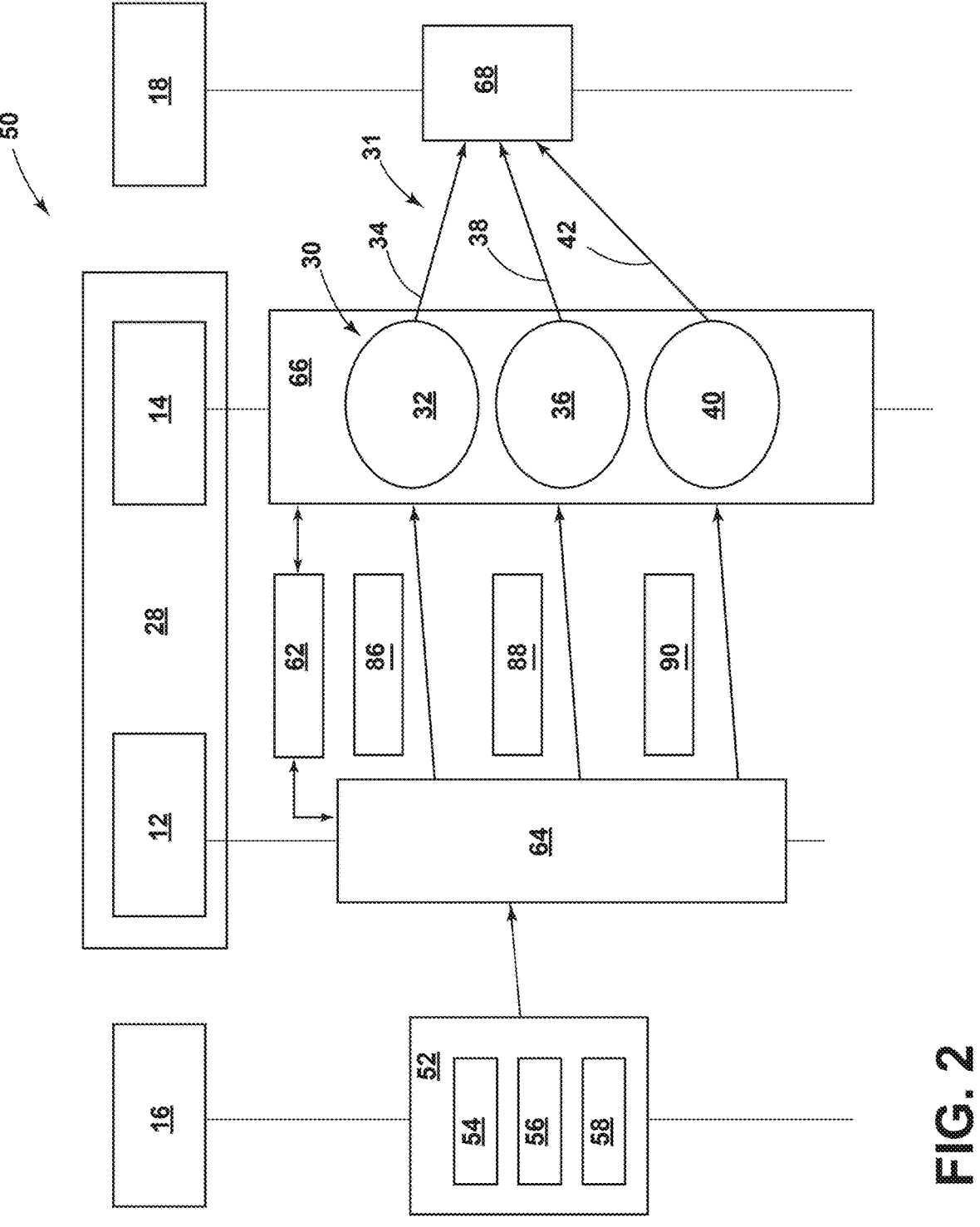
FIG. 2 illustrates a flowchart of a method for optimized multimode messaging in accordance with one non-limiting aspect of the present disclosure.

FIG. 2 illustrates a flowchart 50 of a method for multimode vehicle 24 messaging in accordance with one non-limiting aspect of the present disclosure. The method 50 may be facilitated with the back office optimizer 12, the hybrid platform, 14, the radio access points 30, and/or other hardware (not shown) performing the operations described herein operating according to instructions, commands, etc. generated in response to one or more processors executing according to a corresponding plurality of non-transitory instructions stored on a non-transitory computer-readable storage medium. Block 52 relates to a generation process whereby the servers 16 may generate a plurality of data sets 54, 56, 58 for multimode message transmission to the telematics unit 18. The generation process is illustrated for non-limiting purposes to correspond with the servers 16 generating the plurality of data sets 54, 56, 58, which may be referred to as a first data set 54, a second data set 56, and a third data set 58.

The servers 16 or other entity originating the data sets 54, 56, 58 may generate the data sets 54, 56, 58 simultaneously, successively, or according to other sequencing from a connection external to the private network, such as through an interface, connection, or other medium therewith. The data sets 54, 56, 58 may be commonly addressed to the vehicle 24 and initially transmitted from the servers 16 to the private network 28. The data sets 54, 56, 58 may be utilized, for example, to facilitate over the air (OTA) reflash, vehicle unlock, and/or to provide information or controls used to manipulate additional services other services and/or features onboard the vehicle 24. The generation process may be instigated according to one or more of the originators 22, or applications, systems, etc., associated with one or more of the servers 16 transmitting one or more corresponding messages to the private network 28. The data sets 54, 56, 58, for example, may each include or be comprised of multiple messages arranged into a stream or other transmission construct for purposes of communicating data, video, audio, media, and/or other such materials. While the generation process is shown to originate the data sets 54, 56, 58 from a device offboard of the vehicle 24, the present disclosure fully contemplates the data sets 54, 56, 58 originating from other locations or entities, including from sources onboard or included as part of the vehicle 24.

Block 62 relates to a management process whereby the back office optimizer 12 or other entity associated with the private network 28 may be configured for predicting, monitoring, controlling or otherwise managing operations for the hybrid platform 14. One non-limiting aspect of the present disclosure contemplates the management process including a transmission performance process whereby the back office optimizer 12 may monitor or otherwise assess network performance of the hybrid platform 14, such as by monitoring network performance measurements and/or metrics sufficient for assessing a transmission performance of the radio access points 30 and/or the corresponding radio networks 31. The transmission performance may be used for reflecting transmission timing, throughput, latency, modulation requirements or capabilities, processing schemes, and/or other parameters associated with communicating messaging over the radio networks 31, i.e., requirements for modulating, packaging, formatting, etc. each of the IoT, Wi-Fi, and cellular messages. The management process may include exchanging information between the back office optimizer 12 and/the hybrid platform 14 to assess the operations thereof and/or to exchange control parameters used to control the operations thereof. The management process, as such, may relate to various operations contemplated by the present disclosure to support multimode vehicle 24 messaging.

One non-limiting aspect of the present disclosure contemplates determining the transmission performance from actively monitoring operations of the radio networks 31, such as based on statistics gathered from monitoring transmission of additional data sets 54, 56, 58 or multimode messaging previously transmitted to the vehicle 24 and/or to other vehicles (not shown), i.e., monitoring historical performance of the hybrid platform 14. This type of monitoring may be considered as real-time monitoring or actual monitoring generated based on actual performance of the radio networks 31 when constructed in a real-life or real-world deployment where the corresponding multimode messaging may travel over long distances from the hybrid platform 14 to the telematics unit 18. In such an implementation, for example, the radio access points 30 may be in the control of the private network 28, with the attendant radio networks 31 being in the control of a supplier entity that previously constructed switches, headends, enodes, terminals, towers, stations, etc. within the real word, i.e., a deployed infrastructure constructed by a utility company, Wi-Fi and/or cellular provider, or other multiple service provider.

One non-limiting aspect of the present disclosure contemplates an additional manner for determining the transmission performance based on a simulation for the radio networks 31. The simulation may be performed to set representational behaviors intended to simulate functionality behavior sufficient for controlling the hybrid platform 14, the radio access points 30, and/or the radio networks 31 to provide a virtualized tool capable of modeling an actual implementation of the radio networks 31 without the radio networks 31 having to be actually deployed with infrastructure within the real world. The simulation, for example, may be implemented with a network tool (not shown) having hardware and software constructs configured for simulating communications between the radio access points 30 and the vehicle 24. The simulation, in other words, may be used to provide a testing of environment where multimode messaging may be communicated with the vehicle 24 without the corresponding multimode messaging traveling over actual, real-world deployed infrastructures. The corresponding multimode messaging may be wirelessly transmitted to the vehicle 24, such as with short-range wireless signaling carried without the underlying infrastructure and longer-range transmission that would otherwise be needed for deployed radio networks.

Accordingly, the private network 28, or more specifically the hybrid platform 14 and the radio access points 30, may be configured to support multimode messaging over deployed radio networks and/or simulated or virtual radio networks. For the sake of presentation simplicity, the description herein is predominantly addressed towards the radio networks 31 being deployed such that the multimode messaging carried thereover may be exchanged with the corresponding radio access points 30 to travel over deployed infrastructures, i.e. across wired backbones, towers, cables, etc. whereafter the multimodal messages may be wirelessly exchanged with the vehicle 24. Block 64 relates to the optimization process whereby the back office optimizer 12 may provide optimization information to optimize transmission of the data sets 54, 56, 58 via the private network 28. The optimization information may be generated for specifying performance priority parameters, transmission priority levels, reprioritized priority, synchronization, routing and/or other information to be used at the hybrid platform 14 in identifying and controlling each of the radio access points 30 to wirelessly communicate with one or more of the data sets 54, 56, 58.

Figure 3:
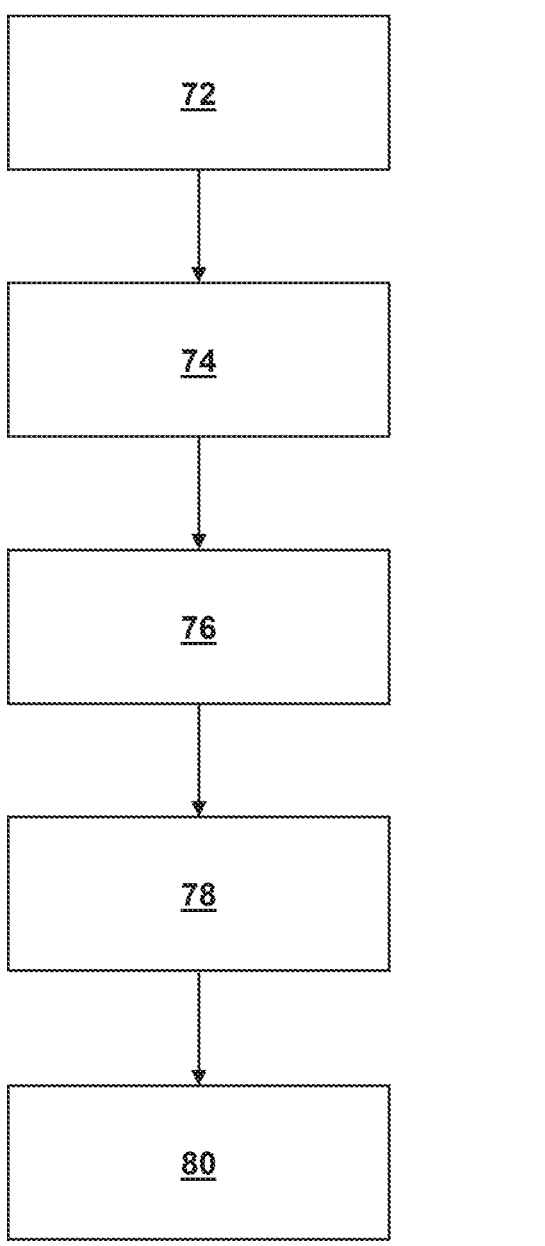
FIG. 3 illustrates a flowchart of an optimization process in accordance with one non-limiting aspect of the present disclosure.

FIG. 3 illustrates a flowchart 70 of the optimization process in accordance with one non-limiting aspect of the present disclosure. Block 72 relates to a parameter identification process whereby the back office optimizer 12 identifies performance priority parameters included within the data sets 54, 56, 58. The performance priority parameters may be embedded information included within the data sets 54, 56, 58 to specify characteristics desired for the transport thereof. The performance priority parameters may be selected by an originator of a corresponding one of the data sets 54, 56, 58 such that the performance primary payer numbers may be representative of characteristics requested by the originator for supporting the transport thereof. The present disclosure contemplates the data sets 54, 56, 58 being used to facilitate communication of a wide variety of data, information, etc., which may occur by packetizing the data, information, etc. within individual packet streams. As one skilled in the art may appreciate, a packet stream may include a plurality of packets generated to transport the data, information, etc. intended to be delivered via the corresponding data set 54, 56, 58. The packets may include a non-fragmentable portion and a fragmentable portion, which may respectively correspond with a header in a payload. The header, for example, may include the performance priority parameters and the payload may include the data, information, etc. intended for transport.

The performance priority parameters may include information for message prioritization, bandwidth allocation, latency control, packet loss reduction, jitter minimization, bandwidth, traffic shaping, congestion management, differentiated services, quality of service, transmission priority level, etc., as one having ordinary skill in the art may appreciate. The information included as part of the performance priority parameters may effectively be requested or desired parameters selected by an originator outside of or external to the private network 28 for controlling transport of the corresponding packets within each of the data sets 54, 56, 58. Instead of relying upon such a message originator to dictate transport for the data sets 54, 36, 58, one aspect of the present disclosure relates to the back office optimizer 12 assessing the performance priority parameters and making adjustments thereto based on the transmission performance of the private network 28, fragmented transmission priority levels, and other variables known to the back office optimizer 12 that may be unknown or unattainable by entities external to the private network 28. The back office optimizer 12 may be configured in this manner to determine a best mode for receiving data sets 54, 56, 58 at the private network 28, directing the data sets 54, 56, 58 thereafter over the private network 28 and ultimately coordinate the transfer thereof for one or more of the radio access points 30 based on the back office optimizer 12 having a proprietary overview and understanding of the private network 28.

The capability of the present disclosure to deviate from the performance priority parameters specified by an originator of the data sets 54, 56, 58 may be advantageous in managing transport of the data sets 54, 56, 58 via the private network 28 so as to overseeing message delivery without being dependent upon the massage originator to control transport, which may in turn enable those having a vested interest in overseeing vehicle messaging, e.g., a party responsible for the private network 28, to maintain and have oversight, assure customer satisfaction, and/or otherwise be involved or participatory in the wireless delivery of multi-mode messaging with the vehicle 24. One aspect of the present disclosure particularly contemplates the back office optimizer 12 adjusting a transmission priority level for the data sets 54, 56, 58 based on operating conditions, throughput, transmission timing, and/or other transmission performance of the private network 28. The transmission priority level may be based on a classification scheme whereby the data sets 54, 56, 58, or more particularly the packets associated therewith, may specify a weight based on a classification assigned thereto, e.g., a weight of 1.0 four a best efforts classification, a weight of 10 for a background classification, a weight of 24 for a standard classification, a weight of 30 for an excellent efforts classification, a weight of 44 for a streaming media classification, a weight of 54 for interactive media classification, a weight of 64 for interactive voice classification, and a weight of 74 for a reserved classification. The weight and attendant classification may vary depending on construction, capabilities, and a wide variety of factors for the private network 28, and as such, the present disclosure is not intended to be limited to the foregoing examples.

The transmission priority level may be used to control cueing of the data sets 54, 56, 58 for transmission through the private network 28. The queuing may relate to the throughput, bandwidth, latency minimization, reliability, etc. provided for transporting the data set 54, 36, 58, optionally with a higher priority or higher weighted transmission priority level receiving or being assigned greater throughput, bandwidth, latency minimization, reliability, etc. relative to a lower priority or lower weighted transmission priority level. The private network 28, for example, may be configured to transport messages within a variety of queues, optionally with more resources being assigned to the queues associated with higher transmission priority levels than the queues associated with lower transmission priority levels. One aspect of the present disclosure relates to the back office optimizer 12 adjusting the transmission priority level assigned by the originator according to the transmission performance of the private network 28 so as to manage transport of the data sets 54, 56, 58 according to transmission priority levels selected by the back office optimizer 12 to the variables known to the back office optimizer 12 that may be unknown or unattainable by entities external to the private network 28, which may in turn enable the back office optimizer 12 to re-scheme or otherwise adjusts message transport according to what it deems best for the private network 28, as opposed to what was requested by an originator of the data sets 54, 36, 58.

Block 74 relates to a fragmentation process whereby the packets of the data sets 54, 56, 58 may be analyzed for fragmentation prior to the back office optimizer 12 adjusting the transmission priority level associated therewith. The fragmentation process may correspond with a deep packet inspection or other assessment of the fragmentable portions thereof, i.e., the payload or other portion of the packets having the data, information, etc. desired for transport as opposed to the portions thereof having the performance priority parameters, source and destination addressing, etc. One aspect of the present disclosure contemplates the fragmentation process determining whether the transmission priority level specified by an originator of the data sets 54, 56, 58 being applicable or necessary for an entirety of the data set 54, 56, 58. This may include assessing whether different data types may be included within a corresponding one of the data sets 54, 56, 58, e.g., the same data set 54, 56, 58 may include video and audio such that the video may be considered as one data type and audio considered as another data type. The fragmentation process may also include assessing whether different applications may be included within the corresponding one of the data sets 54, 36, 58, e.g., the same data set 54, 56, 58 may include data from a telecommunications application and a file download application such that the telecommunication data may be considered as one application type and audio considered as another application type. The determination of data type, application type, or other classification type for the data sets 54, 56, 58 may be beneficial in more particularly differentiating whether the transmission priority level assigned in the performance priority parameters by the originator of the data sets 54, 56, 58 applicable to an entirety thereof or just to selected portions, e.g., the originator may assign a higher transmission priority level due to an entirety of the data set 54, 56, 58 when that higher transmission priority level may be needed or desired or less than an entirety of the data set 54, 56, 58.

The fragmentation process may correspondingly include fragmenting the data sets 54, 56, 58 into subsets based on different data types, application type, etc. included therein. The subsets may each include a portion of the corresponding data set 54, 56, 58 such that the subsets may be subsequently recombined to reform the data set 54, 56, 58. The capability to fragment the data sets 54, 56, 58 into subsets may be advantageous in enabling the back office optimizer 12 to adjust the transmission priority level for the subsets to match with the data type, application type etc. associated therewith rather than being tied or limited to the transmission priority level specified by the originator for entirety of the associated data set 54, 56, 58. Block 76 relates to a reprioritization process whereby the back office optimizer 12 may generate a reprioritize priority for each of the subsets. The reprioritization process may select a reprioritized priority for each of the subsets based on the performance priority parameters of the data set 54, 56, 58 associated therewith. The reprioritization process, for example, may determine whether the transmission priority level specified by the original for the associated data set 54, 56, 58 is applicable to the subsets fragmented therefrom. In the event the originator assigned transmission priority level for the data set 54, 56, 58 is applicable to the associated subset, the reprioritize priority may specify use of the same transmission priority level, and in the event it is inapplicable, the reprioritize priority may increase or decrease the transmission priority level by correspondingly assigning an elevated transmission priority level or a decreased priority level to each of the relevant subsets.

Block 78 relates to a transmission performance process for assessing or generating the transmission performance metrics for the private network 28 proximate in time to the fragmentation process and/or for predicting the transmission performance metrics based on an expected time of communication for the subsets from one or more of the radio access points 30. Block 80 relates to a transmission assignment process for assigning transmission for each of the subsets based on the reprioritize priority associated therewith, i.e., assigning each subset for transmission based on increasing, decreasing, or maintaining the transmission priority level specified for the data set 54, 56, 58 associated therewith. Returning to FIG. 2, one aspect of the present disclosure contemplates assigning the subsets for transport according to a plurality of subsets streams 86, 88, 90 associated with each of the radio access points 30. The quantity and transmission priority level associated with each of the subsets streams may be correlated with the radio access points 30 associated therewith, which in the exemplary illustration may correspond with a gamma stream 86 associated with the IoT radio access point 32, a beta stream 88 associated with the Wi-Fi access point 36, and an alpha stream 90 associated with the cellular radio access point 40. This non-limiting example may correspond with the cellular access point 40 having a higher transmission priority level than the Wi-Fi radio access point 36 and the Wi-Fi radio access point 36 having a higher transmission priority level than the IoT access point 32.

The transmission assignment process may be operable in this manner to facilitate selectively transporting the subsets via one of the subsets streams 86, 88, 90 applicable to the transmission priority level specified in the reprioritize priority assigned thereto. Depending on the transmission performance or network conditions, under some circumstances, the transmission levels, throughput, reliability, etc. of the subsets streams 86, 88, 90 may vary such that a different point in time the Wi-Fi radio access point 36 may be assigned a higher priority level than the cellular radio access point 40 or the IoT access point 32 may have a higher priority level than the Wi-Fi radio access point 36. The transmission assignment process may consider the variations and correspondingly reassign the subsets in light thereof such that the subsets having the highest priority level may be transmitted via the IoT and/or Wi-Fi radio access points 32, 36 instead of the typically higher priority cellular radio access point 40. This capability to match the subsets stream 86, 88, 90 performance to the reprioritize priority of the subsets may be beneficial in attempting to assure the subsets assigned the higher transmission levels are transported to the radio access point 30 having the higher performance at that time.

One aspect of the present disclosure contemplates assessing performance of the radio access points 30 based on a their capability to provide a guaranteed/fixed bitrate or a non-guaranteed/variable bitrate, optionally with the radio access points 30 having a guaranteed bitrate being rated as providing higher performance than the radio access points 30 having non-guaranteed bitrates. Another aspect of the present disclosure contemplates assessing performance of the radio access points 30 based on transport timing expected therefore, e.g., a quantity of milliseconds, anticipated for use of the corresponding radio access point 30 to communicate the subsets provided thereto onward to the vehicle 24, optionally with the radio access point 30 having shorter transport timing being rated as providing higher performance than the radio access points 30 having longer transport timing. The capability to distinguish bitrates, transport timing, or other metrics for the radio access points 30 and then relate those metrics to the transmission priority levels assigned to the subsets as part of the reprioritize priority determined therefore may be beneficial enabling the present disclosure to assess the data type, application type, need for real-time or non-real-time communication, etc. for the subsets and correspondingly assign the subsets to the radio access point 30 likely to meet the desired transmission priority level. Returning to FIG. 2, Block 66 relates to retransmission process whereby the hybrid platform 14 may receive the subsets streams 86, 88, 90 and attended priority parameters and multimode information, and based thereon, control the radio access points 30 to transmit corresponding multimode messages over the radio networks 31. Block 68 may relate to the telematics unit 18 processing the subsets streams 86, 88, 90 for use in directing operation of services onboard the vehicle 24.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for optimizing multimode messaging via a private network having a hybrid platform, comprising:

receiving a plurality of data sets from one or more entities external to the private network;

identifying performance priority parameters included within the data sets, the performance priority parameters including a transmission priority level requested for the data set associated therewith;

fragmenting the data sets into one or more subsets, each subset including a portion of the data set associated therewith;

generating reprioritized priority for the subsets based on the performance parameters specified for the data set associated therewith, including increasing or decreasing the transmission priority level for each one or more of the subsets having data outside of the transmission priority level requested for the data set associated therewith;

assessing transmission performance for a plurality of radio access points configured for transmitting multimode messaging from the hybrid platform, the radio access points supporting communications over a corresponding radio network according to differing types of wireless radio communications; and assigning each of the subsets for transmission via one of the radio access points based on the transmission performance and the reprioritized priority.

2. The method according to claim 1, further comprising:

transmitting the subsets from the radio access points such that at least a portion of the subsets fragmented from a first data set of the data sets are transmitted from different ones of the radio access points.

3. The method according to claim 2, further comprising:

transmitting the subsets of the first data set related to a first data type from a first radio access point of the radio access points and the subsets of the first data set related to a second data type from a second radio access point of the radio access points.

4. The method according to claim 3, further comprising:

selecting the first radio access point from one or more non-cellular access points of the radio access points; and selecting the second radio access point from one or more cellular access points of the radio access points.

5. The method according to claim 4 further comprising:

the first data type corresponding with audio; and the second data type corresponding with video.

6. The method according to claim 4 further comprising:

the first data type corresponding with a first application; and the second data type corresponding with a second application.

7. The method according to claim 6 further comprising:

the first application requiring real-time communication; and the second application requiring non-real-time communication.

8. The method according to claim 1 further comprising:

transmitting the subsets from the radio access points such that at least a portion of the subsets fragmented from a first data set of the data sets are transmitted at an elevated priority level relative to the transmission priority level requested for the first data set.

9. The method according to claim 8 further comprising:

transmitting the subsets of the first data set related to a first data type at the elevated priority level and the subsets of the first data set related to a second data type at the transmission priority level requested for the first data set.

10. The method according to claim 9 further comprising:

identifying the first data type to require cellular based transmission; and identifying the second data type to require non-cellular based transmission.

11. The method according to claim 1 further comprising:

transmitting the subsets from the radio access points such that at least a portion of the subsets fragmented from a first data set of the data sets are transmitted at a decreased priority level relative to the transmission priority level requested for the first data set.

12. The method according to claim 11 further comprising:

transmitting the subsets of the first data set related to a first data type at the decreased priority level and the subsets of the first data set related to a second data type at the transmission priority level requested for the first data set.

13. The method according to claim 12 further comprising:

identifying the first data type to require non-cellular based transmission; and identifying the second type to require cellular based transmission.

14. The method according to claim 12 further comprising:

identifying the first data type to require a non-guaranteed or variable bitrate; and identifying the second data type to require a guaranteed or fixed bitrate.

15. The method according to claim 1, further comprising:

identifying transport timing for each of the radio access points based on the transmission performance; and assigning the subsets having greater reprioritized priority to the radio access points having shorter transport times relative to the subsets having lower reprioritized priority.

16. The method according to claim 14 further comprising:

identifying transmission bitrates for each of the radio access points based on the transmission performance; and assigning the subsets having greater reprioritized priority to the radio access points having greater transmission bitrates relative to the subsets having lower reprioritized priority.

17. A system for optimizing multimode messaging with a vehicle, comprising:

a hybrid platform having a plurality of radio access points configured for supporting multimode messaging with the vehicle according to differing types of wireless radio communications, each of the radio access points supporting communications over a corresponding radio network;

a back office optimizer configured for:

identifying performance priority parameters included within a plurality of data sets, the performance priority parameters including a transmission priority level requested for the data set associated therewith;

fragmenting the data sets into one or more subsets, each subset including a portion of the data set associated therewith;

generating reprioritized priority for the subsets based on the performance parameters specified for the data set associated therewith, including altering the transmission priority level requested for one or more of the subsets;

assessing transmission performance for the plurality of radio access; and assigning each of the subsets for transmission from the hybrid platform via one of the radio access points based on the transmission performance and the reprioritized priority; and a telematics unit configured for use onboard the vehicle to wirelessly receive the data sets over each one of the radio access points operating of the hybrid platform.

18. The system according to claim 17, wherein:

the back office controller is configured for:

identifying at least a portion of the subsets fragmented from a first data set to be associated with at least a first data type from a second data type;

identifying transmission bitrates for each of the radio access points based on the transmission performance;

determining the first data type to require a guaranteed or fixed bitrate;

determining the second data type to require a non-guaranteed or variable bitrate;

assigning the subsets of the first data set associated with the first data type for transmission from one of the radio access points providing cellular based transmission; and assigning the subsets of the first data set associated with the second data type for transmission from one of the radio access points providing non-cellular based transmission.

19. The system according to claim 18, wherein:

the hybrid platform includes an Internet of Things (IoT) message broker controller configured for communicating IoT messages over an IoT network of a corresponding one of the radio access points, a Wi-Fi message controller configured for communicating Wi-Fi messages over a Wi-Fi network of a corresponding one of the radio access points, and a cellular controller configured for communicating cellular messages over a cellular network of a corresponding one of the radio access points, wherein the cellular network provides the cellular based transmission and the IoT and Wi-Fi networks provide the non-cellular based transmissions.

20. A computer-readable storage medium having a plurality of non-transitory instructions stored thereon, which when executed with one or more processors, are operable for optimizing multimode messaging via a private network having a hybrid platform, the non-transitory instructions executable for:

identifying performance priority parameters included within a data set, the performance priority parameters including a transmission priority level requested for the data set;

fragmenting the data set into one or more subsets, each subset including a portion of the data set;

generating reprioritized priority for the subsets based on the performance parameters specified for the data set associated therewith, including increasing or decreasing the transmission priority level for one or more of the subsets;

assessing transmission performance for a plurality of radio access points configured for transmitting multimode messaging from the hybrid platform, the radio access points supporting communications over a corresponding radio network according to differing types of wireless radio communications; and assigning the subsets for transmission via the radio access points based on the transmission performance and the reprioritized priority, including assigning a first portion of the subsets for transmission from a first radio access point of the radio access points and a second portion of the subsets for transmission from a second radio access point of the radio access points.

* * * * *